United States Patent
Edler et al.

(10) Patent No.: US 9,587,728 B2
(45) Date of Patent: Mar. 7, 2017

(54) TORQUE MANAGEMENT UNIT WITH INTEGRATED HYDRAULIC ACTUATOR

(71) Applicant: Eaton Corporation, Cleveland, OH (US)

(72) Inventors: Andrew Edler, Homer, MI (US); Daniel Fisher, Coldwater, MI (US); Scott Besemer, Battle Creek, MI (US); Christian Chimner, Royal Oak, MI (US)

(73) Assignee: Eaton Corporation, Cleveland, OH (US)

( * ) Notice: Subject to any disclaimer, the term of this patent is extended or adjusted under 35 U.S.C. 154(b) by 150 days.

(21) Appl. No.: 14/203,932

(22) Filed: Mar. 11, 2014

(65) Prior Publication Data

US 2014/0274529 A1 Sep. 18, 2014

Related U.S. Application Data

(60) Provisional application No. 61/779,344, filed on Mar. 13, 2013.

(51) Int. Cl.
| | |
|---|---|
| *F16H 48/20* | (2012.01) |
| *F16H 48/22* | (2006.01) |
| *F16H 48/24* | (2006.01) |
| *F16H 48/08* | (2006.01) |
| *F16H 48/32* | (2012.01) |

(52) U.S. Cl.
CPC ............. *F16H 48/22* (2013.01); *F16H 48/24* (2013.01); *F16H 48/08* (2013.01); *F16H 48/32* (2013.01)

(58) Field of Classification Search
CPC ................................. F16H 48/22; F16H 48/24
See application file for complete search history.

(56) References Cited

U.S. PATENT DOCUMENTS

| | | | |
|---|---|---|---|
| 4,474,006 A | 10/1984 | Price et al. | |
| 6,945,899 B2 | 9/2005 | Peura | |
| 2005/0167228 A1* | 8/2005 | Baxter, Jr. | ............... F16H 48/08 192/49 |
| 2010/0263375 A1 | 10/2010 | Grieve | |
| 2012/0029779 A1* | 2/2012 | Dickinson | ............... F16H 48/32 475/86 |

OTHER PUBLICATIONS

Bennett, Workbook to Accompany Medium/Heavy Duty Truck Engines, Fuel & Computerized Management Systems, 3rd Edition, 2009, 5 pages.
Vijayenthiran, Electric Supercharger Offer Diesel Efficiency for Gasoline Engines, Motor Authority, Sep. 22, 2009, <http://www.motorauthority.com/news/1024655_electric-supercharger-offers-diesel-efficiency-for-gasoline-engines>, 7 pages.

(Continued)

*Primary Examiner* — Derek D Knight
(74) *Attorney, Agent, or Firm* — Merchant & Gould P.C.

(57) ABSTRACT

The present disclosure provides an improved, integrated electronically controlled hydraulic-based torque distribution system and related method. The torque distribution system of the present disclosure includes an electric motor that drives a pump that generates hydraulic pressure used to selectively activate a clutch pack to transfer torque to the wheels of a motor vehicle.

19 Claims, 9 Drawing Sheets

(56) References Cited

OTHER PUBLICATIONS

Wager, Does a Supercharged Engine Get Better Fuel Mileage, eHow, as accessed at <http://www.ehow.com/about_5397297_supercharged-engine-better-fuel-mileage.html> on Sep. 11, 2015, 3 pages.
Twin-Charging and Compound Turbo Charging, <<http://my350z.com/forum/forced-induction/460903-twin-charging-and-compound-turbo-charging.html>, Oct. 17, 2009, 10 pages.
Lancia Delta S44, Unique Cars and Parts, as accessed at <http://www.uniquecarsandparts.com.au/car_info_lancia_delta_s4.htm> on Sep. 11, 2015, 2 pages.
Nissan 350Z Ogura Racing Clutch Twin-Charged, <http://www.turbomagazine.com/features/0701_turp_nissan_350z_twin_charged/index.html>, Nov. 30, 2006, 4 pages.
Twincharged: Combining turbocharger and supercharger performance, as accessed at <http://horsepowercalculators.net/tuner_report/twin-charging-combining-turbocharger-and-supercharger-performance> on Sep. 11, 2015, 4 pages.
Twincharger, Wikipedia, as accessed at <https://en.wikipedia.org/wiki/Twincharger> on Sep. 11, 2015, 4 pages.
Turbocharger, Wikipedia, as accessed at <https://en.wikipedia.org/wiki/Turbocharger> on Sep. 11, 2015, 16 pages.
Vtes, Controlled Power Technologies, as accessed at <https://web.archive.org/web/20120601041835/http://www.cpowert.com/products/vtes.htm> on Jun. 1, 2012, 2 pages.

\* cited by examiner

TORQUE MANAGEMENT UNIT WITH INTEGRATED HYDRAULIC ACTUATOR

RELATED APPLICATION

This application claims priority to U.S. Provisional Application Ser. No. 61/779,344 filed on Mar. 13, 2013, which application is incorporated herein by reference in its entirety.

TECHNICAL FIELD

The present disclosure provides an integrated electronically controlled hydraulic torque distribution system for an automotive vehicle and a related method of torque management.

BACKGROUND

Automotive vehicles are typically powered by an engine that drives an output shaft which powers the driven wheels. The driven wheels are typically either the two front wheels, the two back wheels, or all four wheels.

To avoid instability and driveline binding and other undesirables, the drive systems are configured to allow the wheels to spin at different speeds. This feature is beneficial, for example, when the vehicle corners as it enables the wheels on the inside of the corner to spin at a slower speed than the wheels on the outside of the corner, thereby avoiding wheel slip, tire wear, and stress on the drive system.

Some drive systems have integrated torque management systems that are configured to actively manage the torque delivery to each of the wheels. Improved torque management systems that are fast acting, powerful, efficient, reliable and easily serviced are desirable.

SUMMARY

The present disclosure provides an improved, integrated electronically controlled hydraulic-based torque distribution system and related method. The torque distribution system of the present disclosure includes an electric motor that drives a pump that generates hydraulic pressure used to selectively activate a clutch pack that is configured and arranged to transfer torque to the wheels of a motor vehicle.

DETAILED DESCRIPTION

Figure 1:
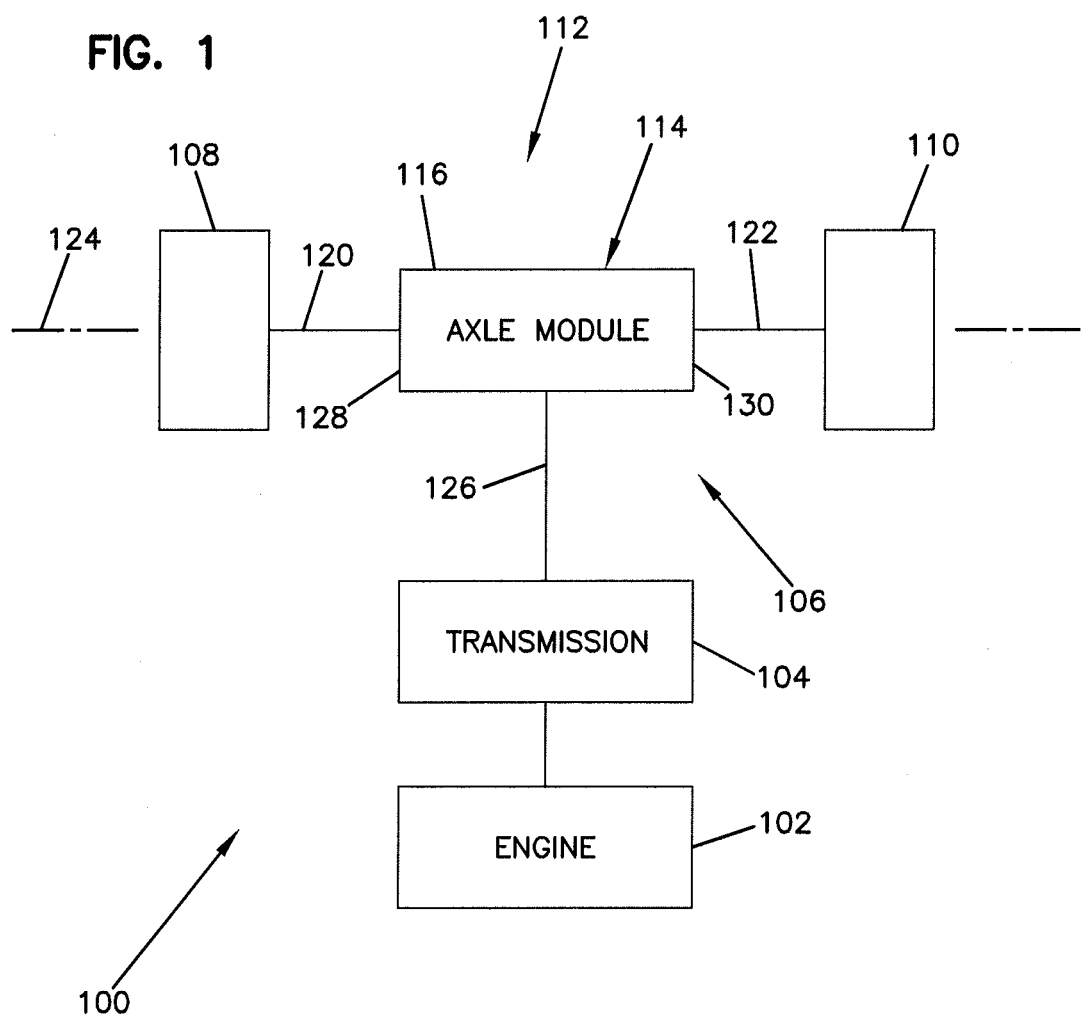
FIG. 1 is a schematic of a powertrain in accordance with the principles of the present disclosure.

FIG. 1 shows an example powertrain 100 in accordance with the principles of the present disclosure. The powertrain includes a prime mover such as an engine 102 coupled to a transmission 104. The powertrain 100 also includes a drivetrain 106 for transferring torque from the transmission 104 to a first wheel 108 (e.g., a left wheel) and a second wheel 110 (e.g., a right wheel). The drivetrain 106 includes an axle assembly 112 including an axle module 114 having an axle module housing 116 containing a differential 118 (see FIG. 2). The differential 118 is coupled to a first axle shaft 120 (e.g., a left axle half-shaft) and is also coupled to a second axle shaft 122 (e.g., a right axle-shaft). The first and second axle shafts 120, 122 can be coaxially aligned and rotatable about an axis 124. The first axle shaft 120 transfers torque from the differential 118 to the first wheel 108 while the second axle shaft 122 transfers torque from the differential 118 to the second wheel 110. The differential 118 is rotatable about the axis 124 and is configured to transfer torque to the first and second axle shafts 120, 122 while concurrently allowing for differential rotational speeds between the first and second axle shafts 120, 122. The drivetrain 106 includes a drive shaft 126 that rotates the differential 118 in about the axis 124. The axle module housing 116 includes a first side 128 that faces toward the first wheel 108 and a second side 130 that faces toward the second wheel 110.

Figure 2:
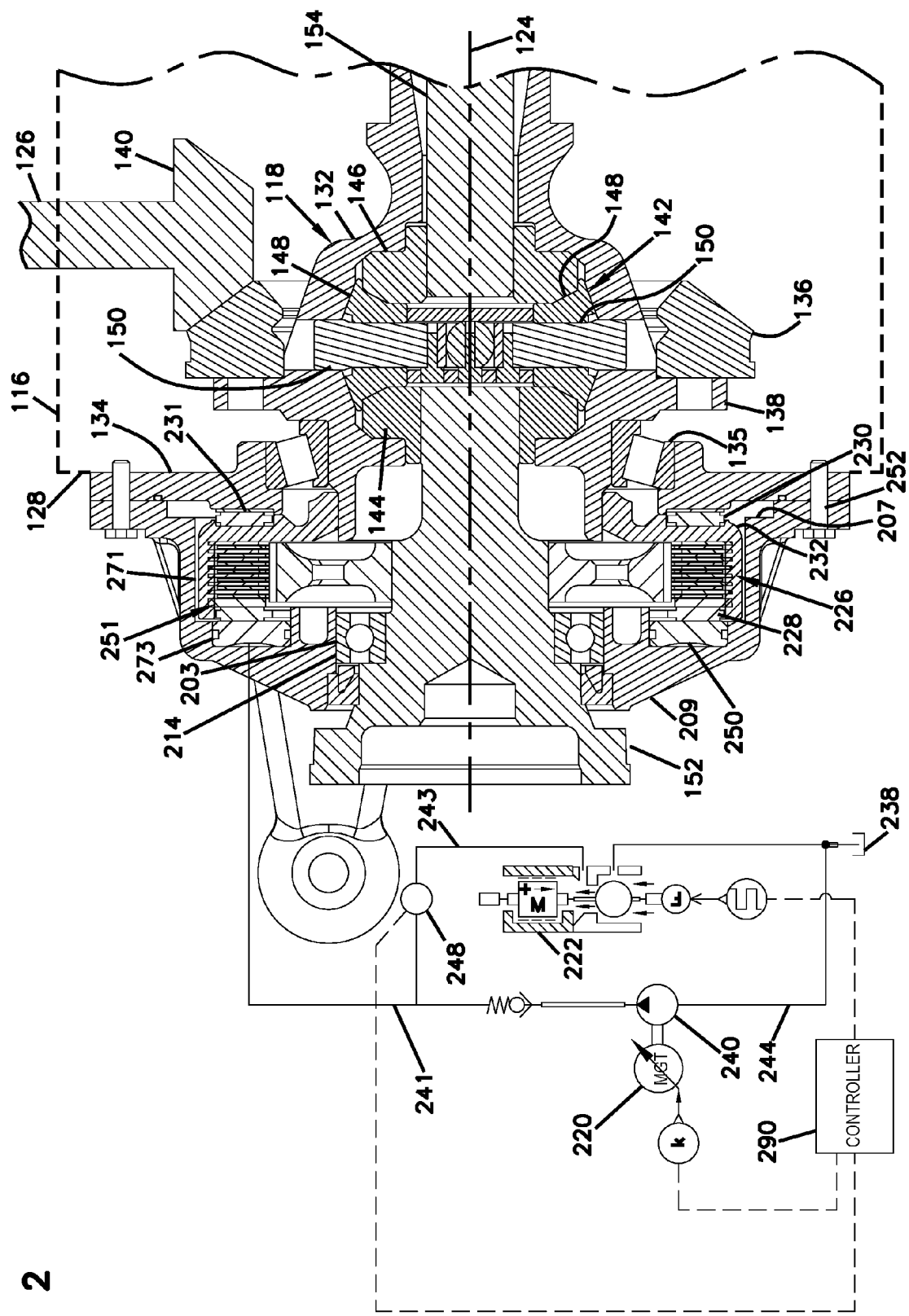
FIG. 2 is a cross-sectional view through an axle module including an example torque management system in accordance with the principles of the present disclosure.
Figure 3:
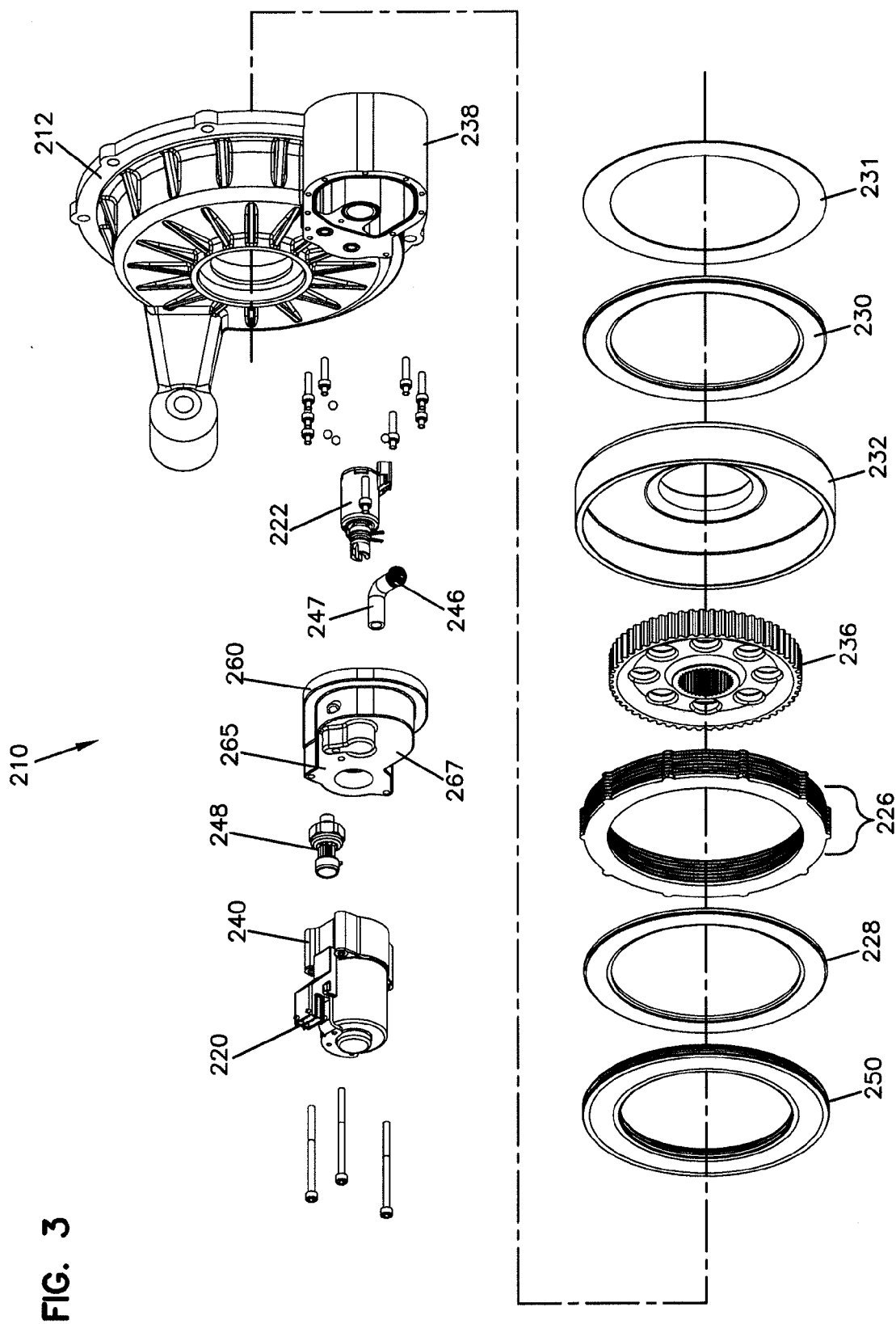
FIG. 3 is an exploded view of the torque management system of FIG. 2.
Figure 4:
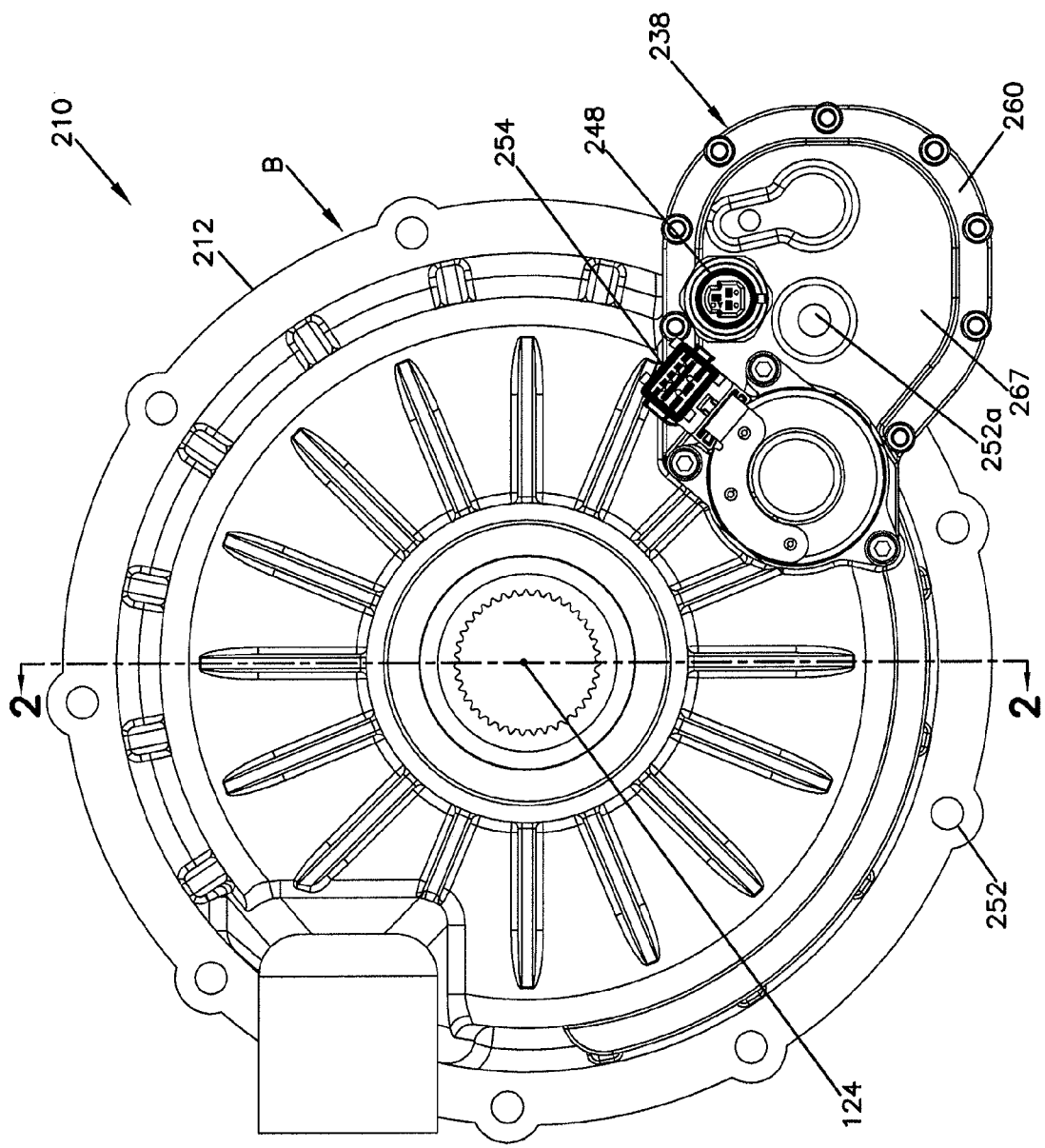
FIG. 4 is an elevation view of the side cover of the torque management system of FIG. 2.
Figure 5:
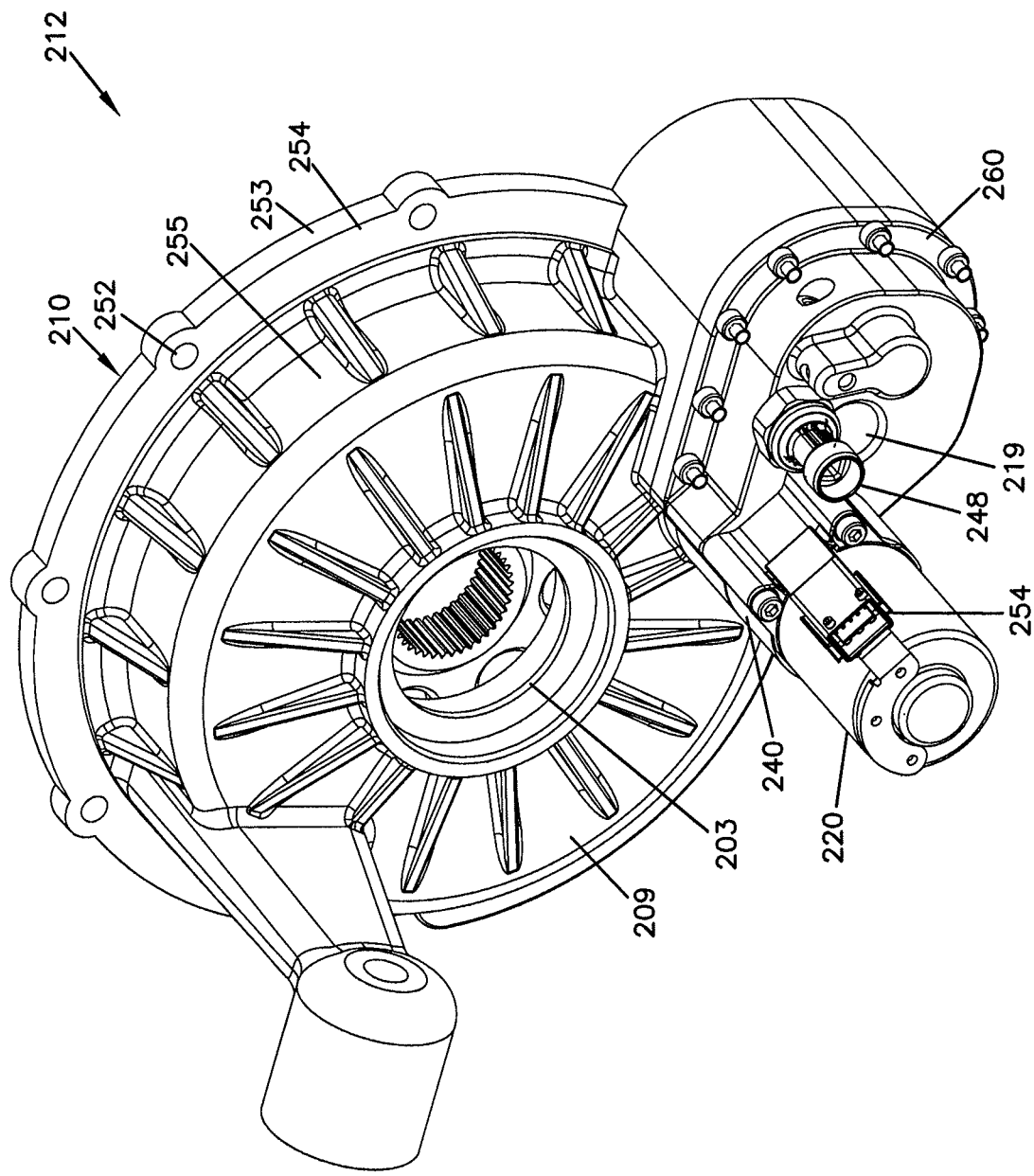
FIG. 5 is a front, assembled, perspective view of the torque management system of FIG. 2.
Figure 6:
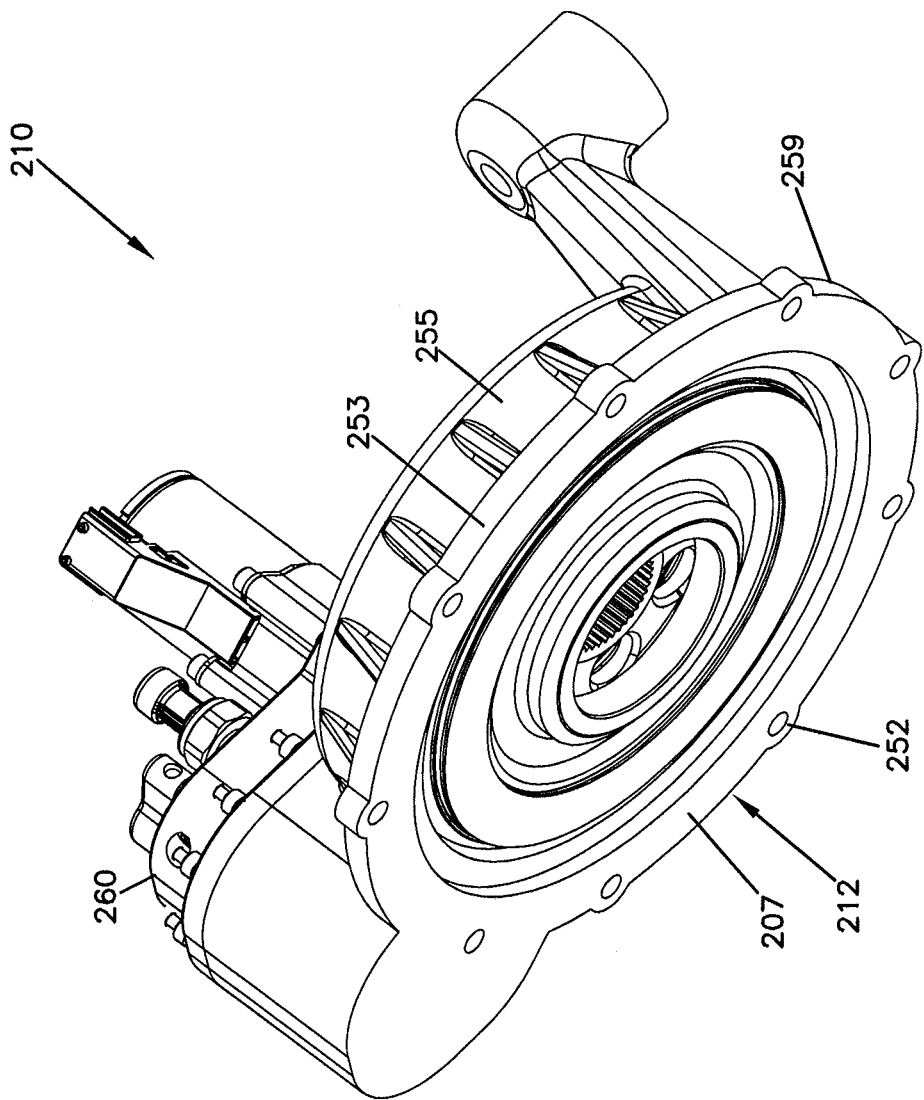
FIG. 6 is a rear, assembled, perspective view of the torque management system of FIG. 2.

Referring to FIG. 2, the differential 118 includes a differential case 132 that is rotatable about the axis 124. The differential case 132 is mounted within the axle module housing 116 by a differential mount 134. A bearing 135 is positioned between the differential mount 134 and the differential case 132 allowing the differential case 132 to rotate about the axis 124 relative to the differential mount 134 and the axle module housing 116. A ring gear 136 is mounted to an exterior flange 138 that extends around the periphery of the differential case 132. The ring gear 136 engages a drive gear 140 coupled to the drive shaft 126. In this way, torque for rotating the differential case 132 about the axis 124 can be transferred from the drive shaft 126 to the differential case 132. It will be appreciated that the axle module housing 116 can contain lubricant for lubricating the various moving parts contained therein.

The differential 118 further includes an internal torque transfer arrangement 142 for transferring torque from the differential case 132 to the first and second axle shafts 120, 122. In one example, torque transfer arrangement 142 can include internal gears (e.g., side gears, pinion gears, etc.) that allow torque to be transferred from the differential case 132 to the first and second shafts 120, 122 while concurrently allowing the first and second axle shafts 120, 122 to rotate at different speeds relative to one another about the axis 124.

Referring still to FIG. 2, the depicted torque transfer arrangement 142 includes first and second side gears 144, 146 that are coaxially aligned along the axis 124. The torque transfer arrangement 142 also includes a plurality of pinion gears 148 positioned between the first and second side gears 144, 146. Each of the pinion gears 148 intermeshes with both the first and second side gears 144, 146. The pinion gears 148 are depicted as being rotatably mounted on shafts 150 anchored to the differential case 132. The torque transfer arrangement 142 further includes first and second stub-shafts 152, 154 (i.e., output shafts) that are coaxially aligned along the axis 124. The first stub-shaft 152 is non-rotatably coupled (e.g., by a splined connection) to the first side gear 144 and the second stub-shaft 154 is non-rotatably coupled (e.g., by a splined connection) to the second side gear 146. The first stub-shaft 152 is adapted to be coupled to the first axle shaft 120 and the second stub-shaft 154 is adapted to be coupled to the second axle shaft 122.

Under normal operating conditions, the differential distributes torque equally between the first and second axle shafts 120, 122. Specifically, the torque is transferred from the differential case 132, through the pinion gears 148 and the first and second side gears 144, 146 to the first and second stub-shafts 152, 154 which transfer the torque to the first and second axle shafts 120, 122. The first and second side gears 144, 146 and the pinion gears 148 are free to rotate relative to the differential case 132 to accommodate different rotational speeds between the first and second axle shafts 120, 122. This allows the wheel on the outside of a turn to rotate faster than the wheel on the inside of the turn.

The configuration of the differential 118 is advantageous for allowing relative rotation between the first and second axle shafts 120, 122 during vehicle turning. However, this type of configuration can be problematic under certain types of driving conditions. Because equal torque is delivered to each of the first and second axle shafts 120, 122, the maximum torque that can be provided to any one axle shaft 120, 122 is dependent upon the maximum torque that can be applied to the other of the axle shafts 120, 122. This is problematic under driving conditions where one of the wheels 108, 110 encounters a low friction condition (e.g., ice, oil, mud, etc.) in which only a minimal amount of torque can be applied to the corresponding axle shafts 120, 122 before the wheel 108, 110 slips. In this type of situation, the amount of torque that can be applied to the axle shaft 120, 122 of the non-slipping wheel 108, 110 is limited to the amount of torque that can be applied to the axle shaft 120, 122 of the slipping wheel. Often, this limited amount of torque is insufficient to turn the non-slipping wheel. Thus, the vehicle is unable to move. In other applications (e.g., steer assist), it is also desirable to be able to vary the distribution of torque provided between the first and second axle shafts 120, 122.

To address the above conditions, axle arrangements in accordance with the principles of the present disclosure can include a torque management system operable in a disengaged state and engaged state. When the torque management system is operated in a disengaged state, the differential 118 essentially functions as an open differential such that the differential 118 delivers torque equally to both the first and second wheels 108, 110. As described above, the level of torque delivery is in part limited by the wheel that has lesser traction. For example, if the first wheel 108 is on dry pavement and will not slip unless 2,000 foot pounds of torque is applied thereto, and the second wheel 110 is over ice and would slip even when 40 or more foot pounds of torque is applied thereto, the torque delivered to each wheel would be 40 pounds when the torque management system is in the disengaged state. In the above described scenario, this low level of torque may be insufficient to move the vehicle.

When the torque management system is in the engaged state, the differential 118 can deliver torque to the wheel with traction well in excess of the amount of torque that would cause the wheel with the least amount of traction to slip, (e.g., 40 or more pounds in the above described scenario). In particular, in one example, the rotation of the first and second wheels 108, 110 and their corresponding first and second axle shafts 120, 122 can be effectively locked together thereby causing the first and second wheels to rotate at the same rate. In one example, the torque management system can prevent relative rotation between the first stub-shaft 152 and the differential case 132 such that both axle shafts 120, 122 have the same rate of rotation about the axis 124 as the differential case 132. In another example, the torque management system can control relative rotation between the first stub-shaft 152 and the differential case 132 such that the amount of torque provided to the non-slipping wheel can be controlled. This would, in the above scenario, enable the wheel on dry pavement to drive the vehicle forward. This type of functionality is particularly useful to prevent (or recover) the vehicle from being stuck in snow, mud, sand or uneven terrain where one of the drive wheels may be suspended in the air.

Torque management systems in accordance with the principles of the present disclosure can also be used to provide stability to the vehicle when the vehicle is traveling on a highway at high speeds. For example, if the vehicle enters a turn and begins to over steer, the torque management system can activate to induce under steering to counter-act the impending or actual over steer. In this way, activation of the torque management system can provide a more controlled driving experience. It should be appreciated that torque control management systems in accordance with the principles of the present disclosure can have many additional alternative functions other than those specifically described above.

Referring to FIGS. 2-9, an example torque management system 210 in accordance with the principles of the present disclosure is shown. In the depicted example, the torque management system 210 includes a differential cover 212 (i.e., a main cover) that mounts to the first side 128 of the axle module housing 116. The cover 212 is shown including a central aperture 203 (i.e., a shaft opening) that receives the first stub-shaft 152. A bearing 214 allows the first stub-shaft 152 to rotate about the axis 124 relative to the differential cover 212. The first stub-shaft 152 extends outwardly from the differential cover 212 and is adapted for connection to the first axle shaft 120 coupled to the first wheel 108. The differential cover 212 includes a first side 207 and an opposite second side 209. When the differential cover 212 is mounted to the axle module housing 116, the first side 207 faces toward the axle module housing 116 and the second side 209 faces away from the axle module housing 116.

Figure 7:
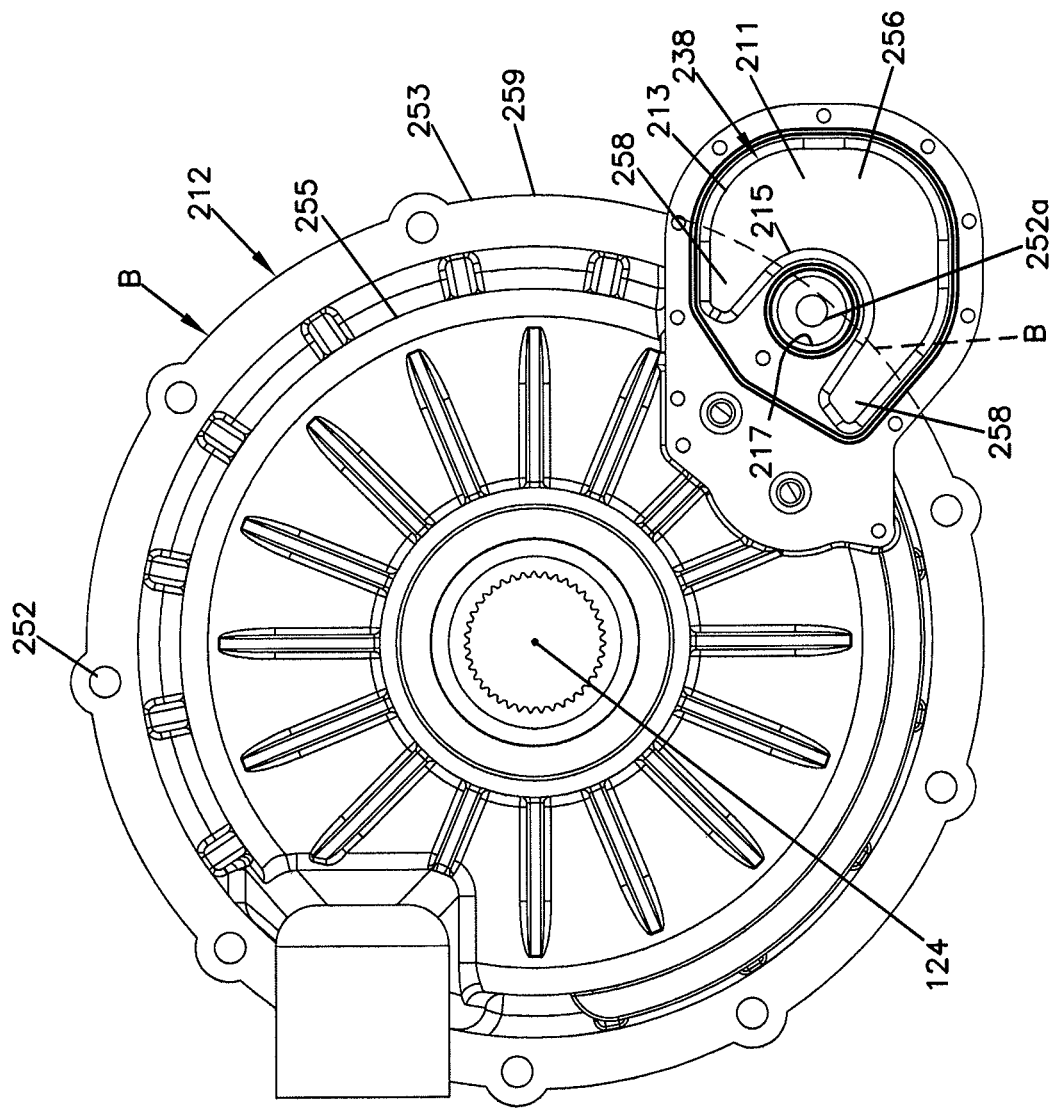
FIG. 7 is a front view of a differential cover of the torque management system of FIG. 2.
Figure 8:
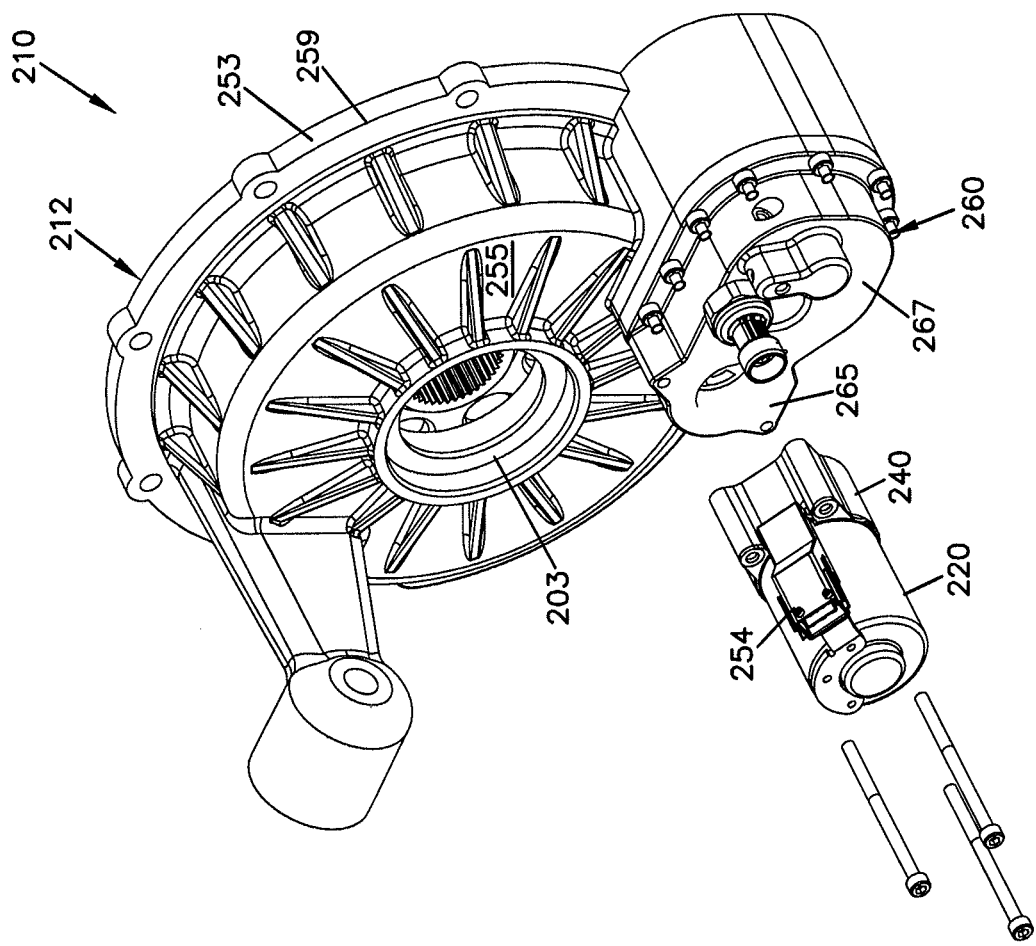
FIG. 8 is a front, perspective view of the torque management system of FIG. 2 with a hydraulic pump and electric motor disconnected from a reservoir cover.

Referring to FIG. 7, the differential cover 212 includes a cavity-defining portion 213 defining a cavity 211 that corresponds to a lower hydraulic reservoir 238. As shown at FIGS. 3-6, a reservoir cover 260 mounts over the cavity defining portion 213 to enclose the hydraulic reservoir 238. The hydraulic reservoir 238 includes at least a portion 256 that extends radially outwardly from a main body 255 of the differential cover 212. In the depicted example, the main body 255 of the differential cover 212 includes a circumferential flange 253 having a peripheral edge 259 that defines a main outer boundary B (e.g., a footprint or outline) of the differential cover 212. The peripheral edge 259 and the main outer boundary B surround the axis 124. When viewed in side elevation (e.g., in an orientation along the axis 124 as shown at FIG. 7), the portion 256 of the reservoir 238 is radially outside the main outer boundary B. The reservoir 238 can also include portions 258 positioned radially inside the main outer boundary B. In one example, the portion 256 can represent a majority of the total volume of the hydraulic reservoir 238. The reservoir cover 260 has a first region 265 that radially overlaps the main body 255 and a second region 267 that projects radially outwardly from the main body 255. The first region 265 is positioned radially inside the main outer boundary B and the second region 267 is positioned radially outside the main outer boundary B when viewed in the orientation along the axis 124.

In the depicted example, the differential cover 212 includes a plurality of apertures 252 spaced-apart from one another along the peripheral edge 259 of the differential cover 212. The apertures 252 are defined though the circumferential flange 253. The apertures 252 are each configured to receive a fastener (e.g., a bolt) used to secure the differential cover 212 to the first side 128 of the axle module housing 116. In this way, the differential cover 212 functions to enclose the first side 128 of the axle module housing 116 such that the differential 118 and lubricant are effectively contained and protected within the axle module housing 116. The main outer boundary B can coincide with (i.e., conform with or match) a shape of a sealed interface between the differential cover 212 and the module housing 116. The fasteners 252 are spaced sufficiently close to one another to ensure effective sealing between the axle module housing 116 and the differential cover 212 along the main outer boundary B.

Figure 9:
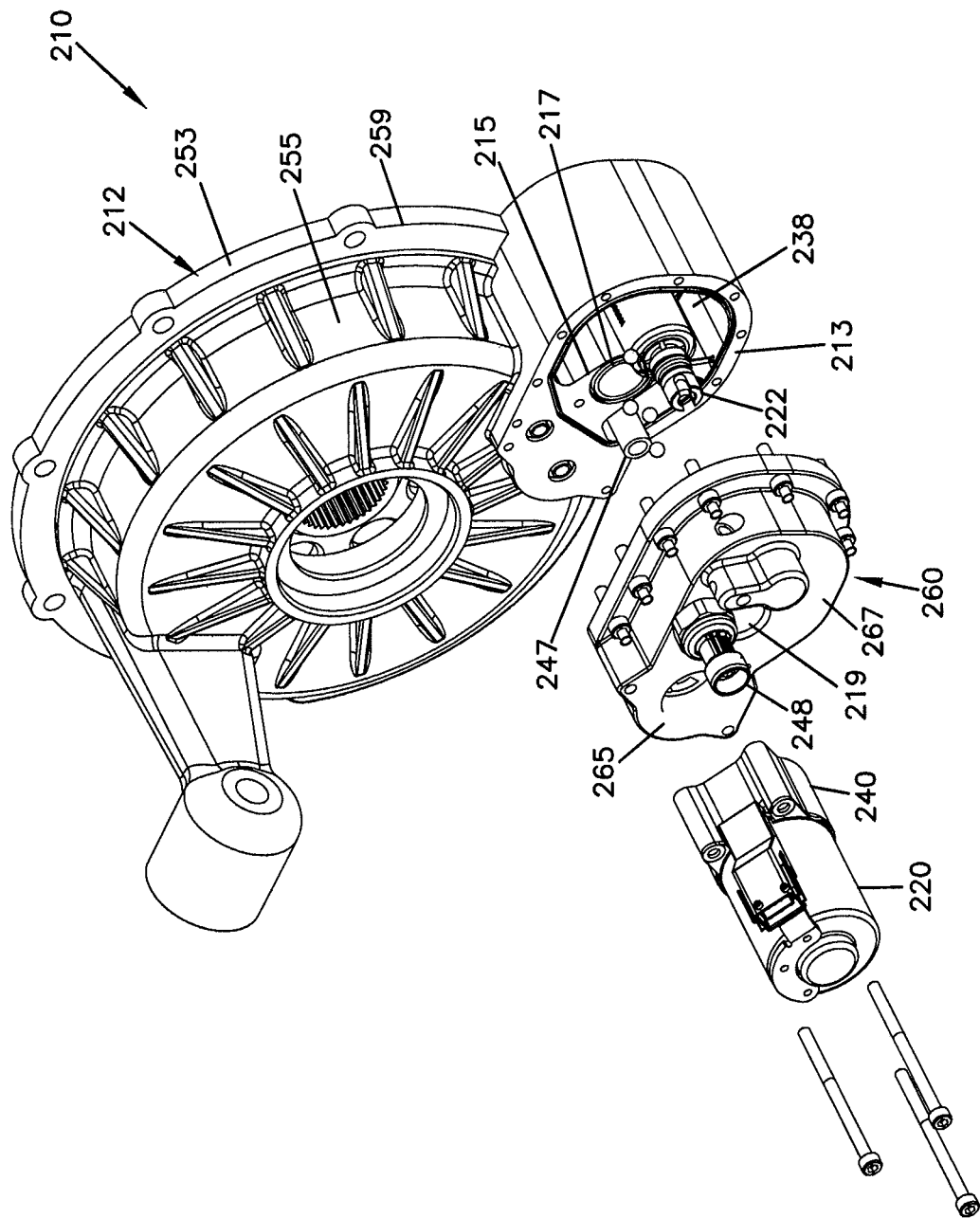
FIG. 9 is a front, perspective view of the torque management system of FIG. 8 with the reservoir cover disconnected form a differential cover.

As shown at FIG. 7, at least one of the apertures 252 (e.g., aperture 252a) extends axially through the lower hydraulic reservoir 238. For example, the cavity defining portion 213 includes a projection 215 that projects radially into hydraulic reservoir 238. A fastener access passage 217 is defined through the projection 215 in alignment with the aperture 252a. As shown at FIG. 9, the reservoir cover 260 defines an opening 219 that aligns with the fastener access passage 217 when the reservoir cover 260 is installed on the cavity defining portion 213. When installed, the reservoir cover 260 forms a seal against the projection 215. The seal extends about fastener access passage 217 prevents hydraulic fluid from the reservoir 238 from entering the fastener access passage 217. The opening 219 and the fastener access passage 217 allow a fastener to be inserted through the aperture 52a from the front and secured to the axle module housing 116 without needing to remove the cover 260. Once the fastener is installed, a head of the fastener can reside in the fastener access passage 217. The opening 219 is positioned at a central region of the reservoir cover 260. It should be appreciated that other alternative configurations are possible.

Referring back to FIG. 3, the torque management system 210 also includes a brushless electric motor 220 mounted adjacent to a hydraulic pump 240. The motor 220 and/or the pump 240 can be carried with the reservoir cover 260. In one example, the motor 220 and the pump 240 are carried with the cover 260. In one example, the pump is mounted to the cover 260 and the electric motor 220 is mounted to the pump 220. In the depicted embodiment, the electric motor 220 and the hydraulic pump 240 are stacked in a coaxial arrangement. In the depicted example, the pump 240 is mounted at the first region 265 of the reservoir cover 260. The electric motor 220 functions to drive the hydraulic pump 240. When the electric motor 220 is activated to rotate in a first direction, the hydraulic pump 220 draws hydraulic fluid from the reservoir 238 and generates hydraulic pressure used to actuate the torque management system from the disengaged state to the engaged state. In the depicted example, a drive shaft of the motor 220 is in line with the pump 220 and is generally parallel to the first and second stub-shafts 152, 154. It should be appreciated that other alternative configurations are possible.

Referring to FIG. 2, an intake line 244 (e.g., a passage) is shown extending from the pump 240 to the lower reservoir 238. The intake line 244 serves as a passage for hydraulic fluid to be drawn into the pump 240 from the reservoir 238. In the depicted example of FIG. 3, the intake line 244 can include a tube 247 having an end positioned within the reservoir 238. The end can include a filter screen assembly 246. The tube 247 can connect to the reservoir cover 260 which can define an internal passage that forms a section of the intake line 244 that extends from the tube 247 to the intake of the pump 240. When the electric motor 220 runs in the first direction, hydraulic fluid is drawn from the reservoir 238 through the intake line 244 into the pump, and is output from the pump 240 through a fluid line 241 (see FIG. 2). The fluid line 241 is configured to provide the fluid pressure generated by the pump 240 to an actuator 251 that when actuated switches the torque management system 210 from the disengaged state to the engaged state. A pressure control line 243 is in fluid communication with the fluid line 241. The pressure control line 243 includes a pressure sensor 248 for monitoring the hydraulic pressure within the fluid line 241. The pressure control line 243 also includes a pressure regulating valve 222 that regulates the pressure in the fluid line 241 by selectively diverting flow to tank 238. It will be appreciated that the torque management system 210 can include a controller 290 (e.g., an electronic controller, a computer, a processing unit, etc.) that interfaces with the pressure sensor 248, the pressure regulating valve 222 and the electric motor 220. The controller can also interface with other feedback sensors that monitor information such as the relative rotational speed between the first and second sub-shafts 152, 154 the torque being transferred through the sub-shafts 152, 154, or other information. Based on feedback information concerning the operation of the axle assembly 112, the electronic controller can control actuation of the actuator 251 to enhance performance of the axle assembly 112. At least portions of the pressure sensor 248 and the pressure regulating valve 422 can be housed within discrete cavities defined by the reservoir cover 260.

In the depicted example, the step of removing the differential cover 212 from the axle module housing 116 simultaneously also removes the electric motor 220, the pump 240, the integral lower hydraulic reservoir 238, the pressure sensor 248 and the pressure regulating valve 222. In the depicted example, the electric motor 220, the pump 240, the pressure sensor 248, and the pressure regulating valve 222 can also be separately removed or installed before or after the differential carrier is connected to the axle module housing 116. The electric motor 220 and pump 240 are external to the reservoir cover 260 and can be removed and replaced without removing the differential cover 212 or the reservoir cover 260. The pressure sensor 248 and the regulating valve 222 can be removed and replaced without removing the differential cover 212 by removing the reservoir cover 260 from the differential cover 212. This module configuration results in a torque management system that is easy to manufacture, assembly and service. It should be appreciated that many alternative configurations are possible.

In one example, the reservoir cover 260, the pump 240, the electric motor 220, the clutch pack 226 and the piston 250 are carried with the cover 212 when the cover 212 is removed from the axle module housing 116. In another example, the cover 212 can be removed from the axle module housing 116 without removing the reservoir cover 260 from the cover 212. In another example, the reservoir cover 260, the hydraulic pump 240 and the electric motor 220 can be removed as a unit from the cover 212 without removing the cover 212 from the axle module housing 116. In still another example, the hydraulic pump 240 and the electric motor 220 can be removed from the reservoir cover 260 without removing the reservoir cover 260 from the cover 212 and without removing the cover 212 from the axle module housing 116.

The depicted actuator 251 of the torque management system 210 includes a clutch pack 226 having a plurality of friction disks. The clutch pack 226 is located at the first side 207 of the differential cover 212. The friction disks include alternating first friction disks and second friction disks. The first friction disks are non-rotatably connected (e.g., coupled by a splined connection, keyed connection or other type of connection that restricts relative rotation) to a clutch basket 232 that is non-rotatably connected to the differential case 132. The second friction disks are non-rotatably connected to a radial adapter 236 that is non-rotatably connected to the first stub-shaft 152. In this way, the first friction disks rotate in unison with the clutch basket 232 and the differential case 132 and the second friction disks rotate in unison with the radial adapter 236 and the first stub-shaft 152. The first and second sets of friction disks are interleaved with respect to one another. The actuator 251 further includes an annular hydraulic piston 250 positioned at the first side 207 of the differential cover 212. The piston 250 is configured to move axially along the axis 124 based on the magnitude of hydraulic pressure applied to the piston through the fluid line 241. The level of hydraulic pressure applied to the piston 250 controls the amount of actuation force applied to the clutch pack 226. When the actuator 251 is fully actuated, the piston 250 applies sufficient axial force to the clutch pack 226 such that the friction disks frictionally engage one another and are prevented from rotating relative to one another. When this occurs, relative rotation is prevented between the first stub-shaft 152 and the differential case 132. By preventing relative rotation between the first stub-shaft 152 and the differential case 132, the side gears 144, 146 and the pinion gears 148 are prevented from rotating relative to the differential case such that the first and second stub-shafts 152, 154, the first and second side gears 144, 146 and the pinion gears 148 all rotate in unison with the differential case 132 about the axis 124. By applying an actuation pressure that is less than the full actuation pressure, the torque management system 212 can be operated to control a torque distribution between the first and second stub-shafts 152, 154.

The differential cover 212 is configured to accommodate the piston 250 and the clutch pack 226. For example, the side 207 of the differential cover 212 that faces toward the axle module housing 116 can include a cavity 271 for receiving and housing the clutch pack 226 and the adapter 236. The differential cover 212 also defines a piston chamber 273 for receiving the piston 250.

When the torque management system 212 is activated, hydraulic pressure from the pump 240 causes the piston 250 to impart an axial force on a thrust bearing 228 that compresses the clutch pack 226 between the thrust bearing 228 and the clutch basket 232. A thrust bearing 230 and bearing race 231 are also provided between the rear side of the clutch basket 232 and the differential mount 134. In the depicted example, the clutch basket 232 rotates with the differential casing 118. The compression of the clutch pack 226 can be sufficient to cause the radial adapter 236 to rotate with the clutch pack 226 which causes the first stub-shaft 152 to rotate with the differential casing 132. The relative rotational speed between the radial adapter 236 and the differential casing 132 can be controlled by the selected and/or modulated activation of the clutch pack 226. When the clutch pack 226 is fully compressed, the first stub-shaft 152 rotates in unison with the second stub-shaft 154 and the differential casing 132. It will be appreciated that other alternative configurations are also possible.

In the depicted example, the clutch pack 226 can be configured to be progressively activated/engaged based on modulation of the hydraulic pressure that acts on the piston 250. If only a small increase in torque is desirable at a given one of the wheels 108, 110, the pressure applied to the piston 250 will be relatively low and the clutch pack will be partially engaged causing some lower level of additional torque to be delivered to the torque deficient wheel. This hydraulic pressure level would be less than the level of hydraulic pressure sufficient to fully lock the differential (i.e., cause the differential to act as a mechanically locked differential) where both wheels 108, 110 are rotated at the same speed regardless of traction. Accordingly, when the differential is locked, enough torque can be transferred to slip one tire on dry pavement at the maximum axle capacity rating. It should be appreciated that many alternative configurations are possible. For example, torque management systems which are not capable of locking the differential are also included within the scope of the present disclosure. In one example, the clutch pack 226 controls (i.e., stops, limits, prevents, regulates, etc.) relative rotation between the differential case 132 and the shaft 152 when actuated.

In the depicted example, the level of pressure applied to the piston 250 is monitored via the pressure sensor 248 and is electronically controlled/modulated in part by controlling the pressure regulating valve 222. In the depicted example, a multiple wired electrical connector 254 is located adjacent the exterior of the electric motor 220. Control signals (e.g., control instructions to the motor 220, control instructions to the pressure regulating valve 222, etc.) and feedback signals (e.g., the hydraulic pressure applied to the piston 250, the temperature of the hydraulic fluid or other various components of the system, etc.) are transmitted to the system controller by a wire having an electrical connector that mates with the electrical connector 254. In the depicted example, the control unit can interface with memory to reference a look-up table that correlates the hydraulic pressure applied to the piston with the torque load applied to the wheels. The hydraulic pressure corresponding to a particular torque request can be dependent on the wear on the system (clutch wear), the temperature of the system, and other factors which can be accounted for by the control system. Accordingly, the system of the depicted embodiment determines the appropriate hydraulic pressure based on the desired torque load. It should be appreciated that other alternative configurations are possible. In the depicted example, the friction disks of the clutch pack 226 are positioned outside of the differential casing 132. This arrangement allows for the friction disks to be relatively large since they do not need to fit within the differential casing 132. In the depicted example, each of the friction disks is generally circular and has an outer diameter that is greater than an overall cross-sectional diameter of the differential casing 132. In one example, the friction disks can have outer diameters that are less than 30 centimeters, and the outer diameter of the differential casing 132 is also less than 30 centimeters. It will be appreciated that many alternative configurations are possible.

In the depicted example, the relatively large diameters of the friction disks improves the longevity of the disks as well as improves the overall performance of the system. As compared to smaller friction disks that are fit within the differential casing, the larger friction disks of the depicted example can provide the same level of torque delivery with less axial force (e.g., less hydraulic pressure is needed or a smaller piston could be used). The disclosed configuration having relatively large friction disks is less noisy, has fewer and smaller vibrations, and generates less heat than systems with smaller friction disks that are positioned within the differential casing. The disclosed configuration is generally more efficient as fewer friction disks can be used to generate the same amount of torque. Due to mechanical factors (e.g., binding of years of friction disks), increasing the number of friction disks generally decreases the efficiency of the clutch pack. It should be appreciated that many alternative configurations are possible. For example, in alternative examples of the torque management system, the system could include friction disks housed within the differential housing.

In the depicted example, the friction disks of a clutch pack 226 are positioned adjacent to the differential cover 212. The clutch pack can be accessed by removing the differential cover 212, removing the piston 250, removing the thrust bearing 228. This modular configuration results in a torque management system that is easy to manufacture, assemble and service. However, as discussed above, it will be appreciated that many alternative configurations are possible.

As described above, in the depicted example, the axial force needed to activate the clutch pack 226 from complete disengagement to full engagement is relatively small. In the depicted example, the system does not rely on an accumulator to provide reserve hydraulic pressure. Instead, the system only uses the electric motor 220 to generate hydraulic pressure via the hydraulic pump 240, as needed. The motor 220 can also be run in reverse, thereby causing the hydraulic pump to run in reverse and quickly decrease the hydraulic pressure acting on the piston 250. However, as discussed above, it should be appreciated that many alternative configurations are possible including, for example, examples that include accumulators.

In the depicted example, when the system is operating normally, the clutch pack 226 is not engaged and therefore results in very little friction loss. The electric motor 220 can be run slowly and/or periodically to maintain a target hydraulic pressure. The default target hydraulic pressure can be modified based on driving conditions through either user input (e.g., moving a dial, switch or other user interface), sensed conditions, or both. When the torque management system is directed to engage the clutch pack 226, the motor 220 can be run at maximum speed or near maximum speed, thereby causing the hydraulic pump 240 to quickly draw hydraulic fluid from the reservoir 238 through the intake line 244 thereby generating reserve hydraulic pressure on the upstream side of the regulating valve 222. The regulating valve 222 can be directed to supply the precise level of hydraulic pressure needed to generate the desired amount of axial force on the clutch pack 226 thereby providing the desired level of torque at a given one of the wheels 108, 110. In the depicted example, the disclosed physical arrangement and configuration of the components enables the use of a relatively small electric motor (e.g., 200 to 300 watt) and relatively low hydraulic pressure (e.g., 200 to 300 psi). For example, as discussed above, the use of large friction disks located outside the differential case 132 can enable the system to fully "lock" the wheels 108, 110 without reliance on an accumulator, large electric motor, and/or high hydraulic pressures. It should be appreciated that other alternative configurations are also possible.

The above specification, examples and drawings included herewith disclose examples of how inventive aspects of the disclosure may be practiced. It will be appreciated that changes may be made and the specifics of the disclosed examples without departing from the spirit and scope of the broad inventive aspects of the disclosure.

What is claimed is:

1. A torque management system for a motor vehicle comprising:
   a differential cover including an interior surface and an exterior surface;
   a first output shaft extending outwardly from the differential cover configured to drive the rotation of a first vehicle wheel;
   a differential carrier rotatable about an axis;
   a gear assembly housed within the differential carrier, the gear assembly being coupled to the first output shaft and a second output shaft, the first and second output shafts being aligned along the axis, the gear assembly being configured to transfer torque from differential carrier to the first and second output shafts while also allowing the first and second output shafts to rotate at a different rotational speeds about the axis, the second output shaft being configured to drive the rotation of a second vehicle wheel;
   an electric motor mounted to the differential cover;
   a hydraulic pump arranged and configured to be driven by the electric motor;
   a pressure regulating valve in fluid communication with the pump; and
   a clutch pack assembly configured to be activated based on hydraulic pressure from the hydraulic pump, the clutch assembly including a plurality of friction disks arranged around the first output shaft, wherein the clutch assembly resists relative rotation between the differential carrier and the first output shaft when activated; and
   wherein the differential cover at least partially defines a lower hydraulic reservoir, wherein the electric motor is mounted to the exterior surface of the differential cover adjacent the lower hydraulic reservoir.

2. The system of claim 1, wherein the plurality of friction disks are positioned outside of the differential carrier.

3. The system of claim 2, wherein at least one of the plurality of friction disks is circular and with a diameter that is greater than an overall cross-sectional diameter of the differential carrier.

4. The system of claim 3, wherein the plurality of friction disks are positioned between a pair of thrust bearings in an axial direction and positioned between the first output shaft and a clutch basket in the radial direction.

5. The system of claim 4, wherein the clutch basket is configured to rotate with the differential carrier.

6. The system of claim 5, wherein the first output shaft is splined to a side gear located within the differential carrier, wherein the first output shaft is splined to a radial adapter, wherein the radial adapter interfaces with the clutch assembly such that the relative rotational speed between the radial adapter and the differential carrier is controlled by modulating the compression of the clutch assembly.

7. The system of claim 4, further comprising a hydraulically driven piston that applies an axial force to the pair of thrust bearings, thereby causing the friction disks to progressively engage, wherein the axial force applied is correlated to the hydraulic pressure that drives the piston.

8. The system of claim 1, wherein the electric motor is a brushless electric motor.

9. The system of claim 1, wherein the electric motor is mounted such that the axis of rotation of the motor is substantially parallel to a rotational axis of the first output shaft.

10. The system of claim 1, wherein the hydraulic pump is adjacent in a coaxial arrangement with the electric motor.

11. The system of claim 1, wherein the differential cover includes a plurality of apertures for receiving bolts, wherein at least one aperture extends through the lower hydraulic reservoir.

12. The system of claim 1, further comprising an electrical connector connected to the exterior of the differential cover.

13. The system of claim 1, wherein clutch pack is configured such it prevents relative rotation between the differential carrier and the first output shaft when fully engaged.

14. A torque management system for a motor vehicle comprising:
   a differential cover including an interior surface and an exterior surface;
   a first output shaft extending outwardly from the differential cover configured to drive the rotation of a first vehicle wheel;
   a differential carrier rotatable about an axis;
   a gear assembly housed within the differential carrier, the gear assembly being coupled to the first output shaft and a second output shaft, the first and second output shafts being aligned along the axis, the gear assembly being configured to transfer torque from differential carrier to the first and second output shafts while also allowing the first and second output shafts to rotate at a different rotational speeds about the axis, the second output shaft being configured to drive the rotation of a second vehicle wheel;
   an electric motor mounted to the differential cover;
   a hydraulic pump arranged and configured to be driven by the electric motor;
   a pressure regulating valve in fluid communication with the pump; and
   a clutch pack assembly configured to be activated based on hydraulic pressure from the hydraulic pump, the clutch assembly including a plurality of friction disks arranged around the first output shaft, wherein the clutch assembly resists relative rotation between the differential carrier and the first output shaft when activated
   wherein the pressure regulating valve is downstream of the pump; and
   further comprising a hydraulic pressure sensor downstream of the pressure regulating valve configured to measure the pressure on the hydraulically driven piston.

15. The system of claim 14, further comprising a hydraulic pressure sensor downstream of the pressure regulating valve configured to measure the pressure on the hydraulically driven piston.

16. A torque management system for a motor vehicle comprising:
   a differential cover including an interior surface and an exterior surface;
   a first output shaft extending outwardly from the differential cover configured to drive the rotation of a first vehicle wheel;
   a differential carrier rotatable about an axis;
   a gear assembly housed within the differential carrier, the gear assembly being coupled to the first output shaft and a second output shaft, the first and second output shafts being aligned along the axis, the gear assembly being configured to transfer torque from differential carrier to the first and second output shafts while also allowing the first and second output shafts to rotate at a different rotational speeds about the axis, the second output shaft being configured to drive the rotation of a second vehicle wheel;
   an electric motor mounted to the differential cover;
   a hydraulic pump arranged and configured to be driven by the electric motor;
   a pressure regulating valve in fluid communication with the pump; and
   a clutch pack assembly configured to be activated based on hydraulic pressure from the hydraulic pump, the clutch assembly including a plurality of friction disks arranged around the first output shaft, wherein the clutch assembly resists relative rotation between the differential carrier and the first output shaft when activated,
   wherein the differential cover including a main body having a peripheral flange that defines a main outer boundary, the differential cover including a cavity-defining portion that defines a cavity, wherein the cavity corresponds to a hydraulic reservoir, and wherein at least a first portion of the hydraulic reservoir extends radially outside the main outer boundary.

17. The system of claim 16, further comprising a reservoir cover that mounts to the exterior surface of the differential cover, the reservoir cover enclosing the hydraulic reservoir.

18. The system of claim 17, wherein the hydraulic pump is mounted on the reservoir cover.

19. The system of claim 17, wherein the reservoir cover includes a first portion that radially overlaps the main body of the differential cover and a second portion that projects radially outwardly from the main body of the differential cover, and wherein the hydraulic pump is mounted on the first portion of the cover.

* * * * *